United States Patent
Munoz De Juan

(10) Patent No.: US 11,691,366 B2
(45) Date of Patent: Jul. 4, 2023

(54) SYSTEM AND METHOD FOR MANUFACTURING FITTINGS AND CONNECTIONS FOR BIAXIALLY-ORIENTED PLASTIC PIPES

(71) Applicant: MOLECOR TECNOLOGIA, S.L., Madrid (ES)

(72) Inventor: Igancio Munoz De Juan, Madrid (ES)

(73) Assignee: MOLECOR TECNOLOGIA, S.L., Madrid (ES)

(*) Notice: Subject to any disclaimer, the term of this patent is extended or adjusted under 35 U.S.C. 154(b) by 372 days.

(21) Appl. No.: 17/051,920

(22) PCT Filed: May 4, 2018

(86) PCT No.: PCT/ES2018/070339
§ 371 (c)(1),
(2) Date: Oct. 30, 2020

(87) PCT Pub. No.: WO2019/211498
PCT Pub. Date: Nov. 7, 2019

(65) Prior Publication Data
US 2021/0229381 A1 Jul. 29, 2021

(51) Int. Cl.
| | |
|---|---|
| *B29D 23/00* | (2006.01) |
| *B29C 55/26* | (2006.01) |
| *B29C 53/08* | (2006.01) |
| *B29K 105/00* | (2006.01) |
| *B29L 23/00* | (2006.01) |
| *B29C 35/02* | (2006.01) |

(Continued)

(52) U.S. Cl.
CPC ............ *B29D 23/001* (2013.01); *B29C 55/26* (2013.01); *B29C 49/08* (2013.01); *B29C 49/4205* (2013.01);
(Continued)

(58) Field of Classification Search
CPC ..... B29D 23/001; B29C 55/26; B29C 53/083; B29C 53/08; B29C 57/04; B29C 57/045; B29C 43/34; B29C 2035/0283; B29C 49/08; B29C 49/085; B29C 49/086; B29C 49/4205; B29C 49/42065;
(Continued)

(56) References Cited

U.S. PATENT DOCUMENTS 5,030,083 A * 7/1991 Kohno ................. B25J 17/0258
901/17
5,066,212 A * 11/1991 Moran, Jr. ............ B29C 31/002
425/402

(Continued)

FOREIGN PATENT DOCUMENTS

| EP | 1108523 A1 | 6/2001 |
|---|---|---|
| GB | 1487403 | 9/1977 |

*Primary Examiner* — Jeffrey M Wollschlager
(74) *Attorney, Agent, or Firm* — Hayes Soloway PC

(57) ABSTRACT

The present invention discloses a system and a method for manufacturing fittings and connections for biaxially-oriented plastic tubes in an integral way from straight preformed tubes, with the possibility of adjusting and distributing the thicknesses as well as adjusting the specific stretching in the different areas of the fittings, allowing them to be reinforced or optimized during the method itself and without causing an increase in the production time or an increase in the raw material used, such that it allows for the manufacture of fittings of different geometric shapes (curves, tapers, couplers, branches, etc.)

20 Claims, 3 Drawing Sheets

(51) Int. Cl.
*B29C 49/42* (2006.01)
*B29C 49/08* (2006.01)

(52) U.S. Cl.
CPC .... *B29C 49/4242* (2013.01); *B29C 49/42065* (2022.05); *B29C 49/42073* (2022.05); *B29C 53/083* (2013.01); *B29C 2035/0283* (2013.01); *B29K 2105/258* (2013.01); *B29L 2023/225* (2013.01)

(58) Field of Classification Search
CPC ....... B29C 49/42071; B29C 49/42073–42091; B29C 49/4242–425; B29K 2105/258; B29L 2023/225
See application file for complete search history.

(56) References Cited

U.S. PATENT DOCUMENTS

| | | | | |
|---|---|---|---|---|
| 5,942,171 | A * | 8/1999 | Prenger | B29C 48/09 |
| | | | | 264/237 |
| 6,287,508 | B1 * | 9/2001 | Stripe | B29C 53/083 |
| | | | | 264/573 |
| 6,447,710 | B1 * | 9/2002 | Prevotat | B29C 57/08 |
| | | | | 425/530 |
| 6,855,287 | B1 * | 2/2005 | Anzai | B29C 53/083 |
| | | | | 264/573 |
| 2003/0155694 | A1 | 8/2003 | Rowley | |
| 2004/0258789 | A1 * | 12/2004 | Phillips | B29C 53/083 |
| | | | | 425/384 |

* cited by examiner

SYSTEM AND METHOD FOR MANUFACTURING FITTINGS AND CONNECTIONS FOR BIAXIALLY-ORIENTED PLASTIC PIPES

CROSS-REFERENCE TO RELATED APPLICATIONS AND PRIORITY

This patent application claims priority from PCT Patent Application No. PCT/ES2018/070339 filed May 4, 2018. This patent application is herein incorporated by reference in its entirety.

OBJECT OF THE INVENTION

The present invention relates to a system and a method for manufacturing fittings and connections for biaxially-oriented plastic tubes in an integral way from straight preformed tubes, with the possibility of adjusting and distributing the thicknesses as well as adjusting the specific stretching in the different areas of the fitting, allowing them to be reinforced or optimized during the method itself and without causing an increase in the production time or and increase in the raw material used.

The object of the invention is a system that allows for the manufacturing of fittings with different geometric shapes (curves, tapers, couplers, derivations, etc.).

The invention lies within the field of manufacturing systems and processes for molecularly-oriented profiles, specifically those of "in-batch" systems.

BACKGROUND OF THE INVENTION

Molecular orientation is a process in which, by applying a mechanical deformation to a previously extruded tube or preform tube under suitable conditions mainly of temperature, pressure, deformation speed and deformation radius, a substantial change is produced in the mechanical properties thereof, being mainly the tensile strength of the material, the resistance to impact, creep improvement, resistance to the spreading of cracks, improvement in Young's modulus, etc.

Said molecular orientation process achieves an ultra-resistant material, with less raw material and equal or greater features, thanks to the greater resistance of the material.

There are different methods or systems for manufacturing tubular profiles, which can be grouped into two large categories: Continuous or in-line systems, and discontinuous or in-batch systems.

The discontinuous, or in-batch, systems are mainly based on producing the molecular orientation "item by item", which is achieved by expanding the preform tube in a mold that provides the final shape of the tubular profile.

In-line processes are radically different and the orientation is produced in a continuous way, simultaneous to the extrusion itself, with no interruption in the process or intermediate stock, etc.

The oriented tubes must be joined to each other to form a conduction line, and this must be adapted to the geographic and technical profile of the project. In other words, the conduction line must have the possibility of following lines with curves, branching out, varying the diameter of the conduction, etc. so that the transportation of fluid is adaptable to specific needs in each case.

This need for oriented tubes has been traditionally addressed by different solutions, always using other materials. The most traditional solution, which is over 100 years old, consists of using casted fittings, although recently fittings made from polymers injected into molds are used in a limited way.

Different technologies without applying molecular orientation to products can be found, which allow for the manufacture of similar objects in the form of the mentioned fittings, always in the field of plastics, since in the field of casted fittings there are no similarities:

Injection; a widely used technology that allows pieces to be manufactured in a closed mold thanks to the injection of melted plastic, which fills the cavity of the mold. This technology is different from the technology of the present invention since it uses a melted material as a starting material, without orientation, wherein the cavity refilled with the material (mold) has the form of the final piece, and in which there are numerous pieces in the mold to prevent the material from filling the hollow pieces, in addition to the fact that it does not use fluid as an expansion element, etc.

Mechanization: a technology in which, starting with preforms of a specific material, by removing shavings, the appropriate form of the piece is achieved. In this technology there is no molecular orientation and the step of going from the preform to the final piece takes place by means of removing material, which widely differs from the technology of the present invention.

There are processes of plastic transformation that could also have apparent similarities to the present invention, but which nevertheless are radically different.

Heat blowing: wherein a specific element is subjected to pressure so that it takes on a specific form against a mold. Since it does not produce orientation, this process does not have handlers that allow the preform to be deformed or stretched, if the cooling thereof is based on a system of airflow or another fluid, rather the cooling is produced in contact with the same mold. Likewise, the pieces go directly from extrusion to molding because the temperature is not as significant, and thus this system does not have a tempering cabin and an air treatment system is not required since the expansion fluid only creates the form, but does not affect the expansion. Ultimately, it is a system that is very different from that of the present invention.

The system and method for manufacturing fittings and connections for biaxially-oriented plastic tubes of the present invention solves all of the aforementioned drawbacks.

DESCRIPTION OF THE INVENTION

The present invention relates to a system and a method for the manufacturing of fittings and connections for biaxially oriented plastic tubes that allow different types of oriented PVC fittings or other polymers to be manufactured from a straight preform of a non-oriented polymer tube.

These fittings can possibly have an integral mouth (specific geometry for joining one tube to another, the geometry having a greater diameter than the nominal geometry of the tube and which allows a rubber ring to be housed, thereby sealing the system, preventing the fluid from leaking out of the system), since it allows different geometries to be carried out by simply varying a mold, taking advantage of all of the elements of the system.

According to the system of the invention, the manufacturing of different types of fittings or connections of oriented polymers is achieved from straight preforms with a constant geometry previously obtained by extrusion.

The system for the manufacturing of fittings and connections for biaxially-oriented plastic tubes from a straight preform tube of non-oriented polymer tubing comprises a first end and a second end, wherein the system comprises:

heating means, configured to control the temperature of the preform tube;

a tempered climatic chamber configured to maintain the temperature of a preform tube at a first predetermined temperature, optionally for operations of deforming the tube;

a first gripping head and a second gripping head, wherein the first gripping head is configured to grip the first end of the preform tube and the second gripping head is configured for gripping the second end of the preform tube;

handling means configured to support the first gripping head and the second gripping head, a base plate that supports two mobile pieces configured to move about;

a mold that comprises at least two parts, wherein each one of the parts of the mold is arranged on a mobile piece of the base plate, wherein the mold is configured to orient a deformed tube or the preform tube when the at least two parts of the mold are arranged in contact.

The handling means together with the first and second gripping head are configured to rotate, stretch, contract and/or deform the preform tube, such that in one fiber of the preform tube there is a stretching while in another fiber of the preform tube there is a compression, stretching or compression at will.

Optionally, at least the first or the second gripping head comprises insertion/extraction means of a fluid inside of a deformed tube or the preform tube, with the object of introducing fluids and extracting them, creating internal currents of fluid in the preform tube, internally spraying, pressurizing and expanding them, with the object of cooling and expanding the deformed tube or the preform tube; for example such that in a fiber of the preform tube a stretching is produced, while in another fiber of the preform tube a compression, stretching or compression at will is produced.

The mold further comprises gripping means arranged at ends of the mold, coinciding with the first end and the second end of the preform tube when the at least two parts of the mold are arranged in contact, wherein the gripping means are configured to clamp the deformed tube or the preform tube when the at least two parts of the mold are arranged in contact, such that the inside of the deformed tube or the preform tube together with the first and second head create a sealed space wherein it is possible to carry out the pressurization of the same.

Optionally, the system further comprises cutting and/or finishing means of the fittings or connections formed configured to cut the ends of the formed fitting or connection.

Optionally, the system comprises a distribution table wherein the straight preform tube of the non-oriented polymer tubing is arranged and is configured to cut the preform tube into pieces of varying lengths.

The invention also relates to a method for manufacturing fittings and connections for biaxially-oriented plastic tubes from a straight preform tube of a non-oriented polymer tube which comprises a first end and a second end, wherein the system comprises:

a heating stage, wherein a temperature control of the preform tube is carried out;

a temperature adjustment stage, wherein a temperature control of the preform tube is maintained at a first predetermined temperature;

a gripping stage wherein the gripping of the first end of the preform tube and the second end of the preform tube is carried out;

a molding stage by means of a mold that comprises at least two parts, wherein the orientation of a deformed tube or of the preform tube is carried out when the at least two parts of the mold are arranged in contact.

The method for manufacturing fittings and connections for biaxially-oriented plastic tubes further comprises a stage of rotation, stretching, contraction and/or deformation of the preform tube after the gripping stage of the first end of the preform tube and of the second end of the preform tube.

Optionally, the method comprises a stage of insertion/extraction of a fluid in the inside of the deformed tube or the preform tube, with the object of introducing fluids and extracting them, creating internal currents of fluid in the preform tube, internally spraying, pressurizing and expanding them, with the object of cooling and expanding the deformed tube or preform tube; such that, for example, in a fiber of the preform tube a stretching is produced, while in another fiber of the preform tube a compression, stretching or compression at will is produced.

The method further comprises a stage of clamping the deformed tube or the preform tube when the at least two parts of the mold are arranged in contact, such that the inside of the deformed tube or the preform tube together with the first and second head create a sealed space, followed by a stage of pressurizing said sealed space.

Optionally, the method further comprises a stage of cutting and/or finishing the ends of the formed fittings or connections.

Optionally, the method further comprises a stage of cutting the preform tube in pieces of variable lengths.

DESCRIPTION OF THE DRAWINGS

As a complement to the description being made, and for the purpose of helping to make the characteristics of the invention more readily understandable, in accordance with a preferred practical exemplary embodiment thereof, said description is accompanied by a set of drawings constituting an integral part thereof which, by way of illustration and not limitation, represent the following.

PREFERRED EMBODIMENT OF THE INVENTION

The system and method for manufacturing fittings and connections for biaxially-oriented plastic tubes of the present invention is described in further detail below.

Figure 1:
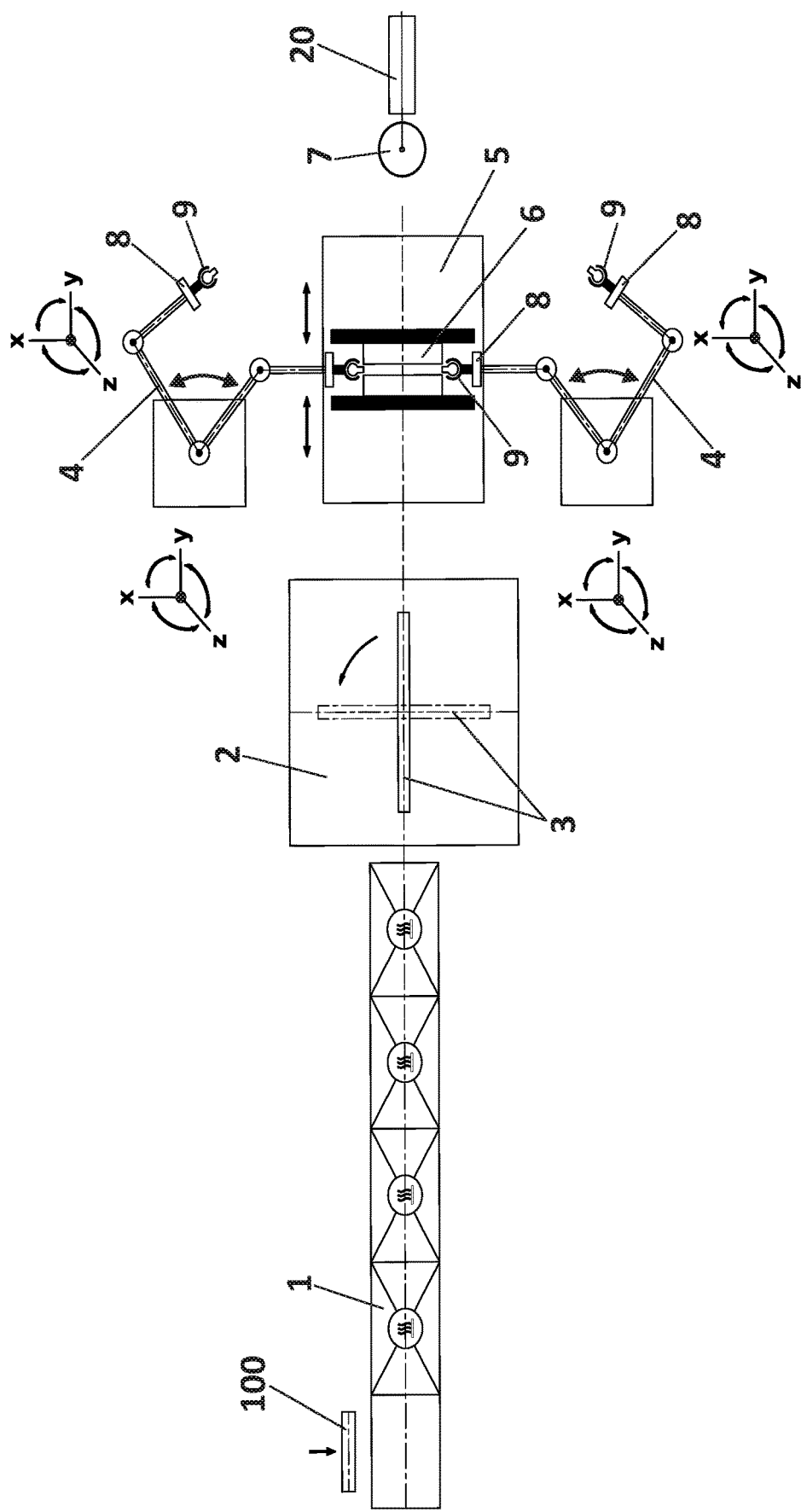
FIG. 1 shows a schematic view of the system for manufacturing fittings and connections for biaxially-oriented plastic tubes of the present invention.

FIG. 1 shows the different elements of the system or stages of the method. Firstly, the preform tube (100) which passes through heating means or an oven (1) that consists of adjustable heating elements is shown. After passing through the oven (1) the preform tube (100) reaches a regular temperature on the entire geometry thereof that is suitable for the orientation, in other words, a temperature that makes the polymer go from a rigid state to a plastic state, and can thus be deformed to one's convenience and is susceptible to molecular orientation during this deformation.

Figure 2:
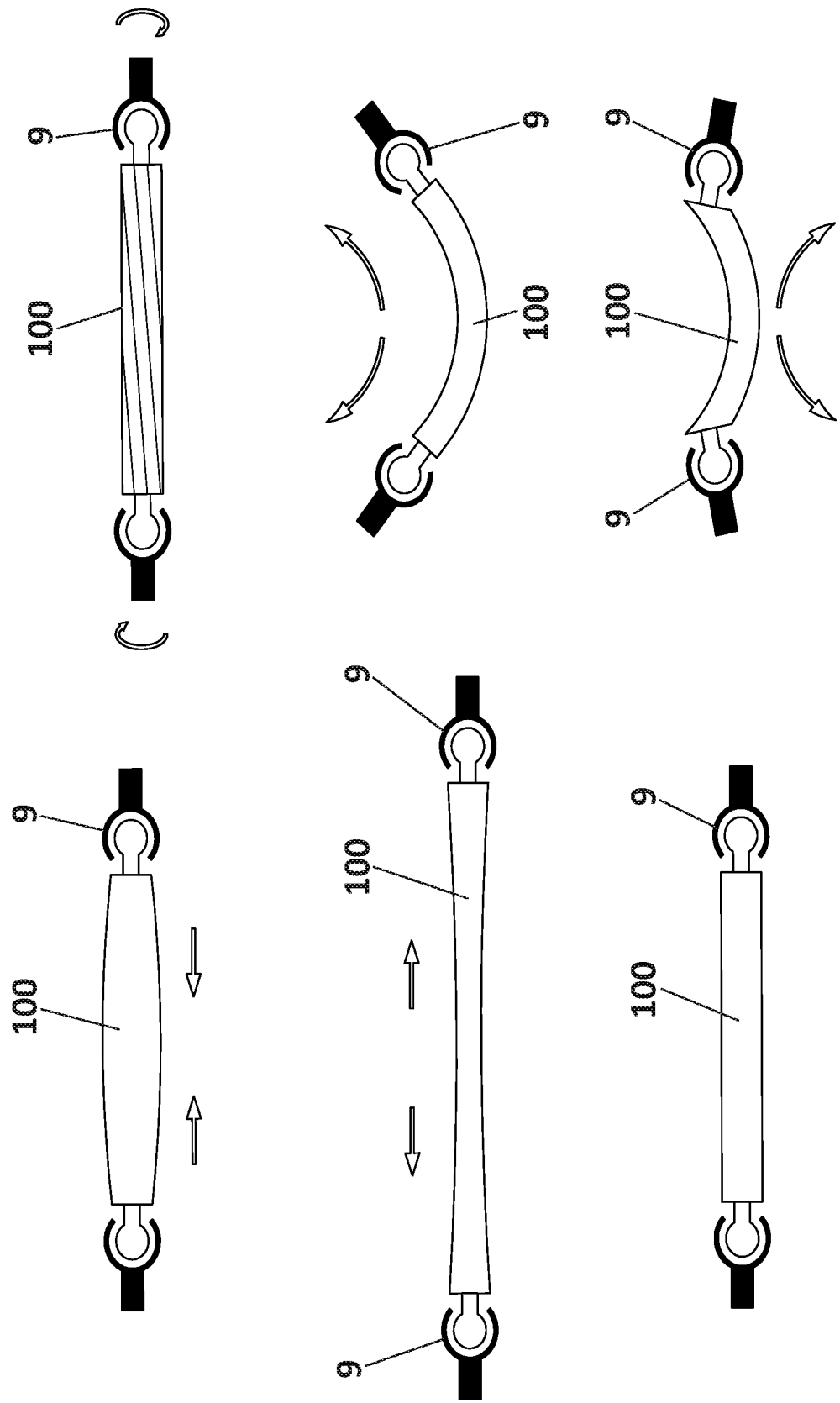
FIG. 2 shows non-limiting examples of the different operations that can be carried out in the tempered climatic chamber by the handling means together with the first and second gripping head.

After the preform tube (100) is conditioned, the same passes to a tempered climatic chamber (2), the purpose of which is to prevent the preform tube (100) that is heated for the orientation thereof from experiencing temperature changes while different operations are carried out, such as the fastening and subsequent deformation in any of the possibilities thereof, among others, as desired for the final result and the distribution of the orientation. Descriptive but non-limiting examples can be found in FIG. 2.

The temperate climatic chamber (2) further comprises a rotating support (3) configured to place the preform tube (100) such that the fastening thereof is facilitated by handling means (4), which are preferably two articulated handlers or arms. The handling means (4) support a first gripping head and a second gripping head (9) with a swivel system (XX) and insertion/extraction means (8) of a fluid inside the deformed tube or the preform tube that carry out the conditioning of said fluid. The function of these swivel heads (9) consists of gripping the preform tube (100) by the ends and once they are gripped being able to deform it in any direction, able to thereby achieve the selective molecular orientation parameters after the expansion thereof. In other words, these handling means (4) with heads (9) can axially stretch or contract the preform tube (100), rotate on the axis and create circumferential deformation, or rotate on the planes perpendicular to the axis of the preform tube (100) such that the same experiences a stretching at the fibers of the section and contraction in others. Furthermore, these handling means (4) can rotate such that the preform tube (100) bends, taking on different angles. Examples of the movement of the assembly of handling means (4)-gripping heads (9) are reflected in FIG. 2.

In turn, the handling means (4) comprise means for inserting/extracting a fluid (8) inside the deformed tube or preform tube that carry out the conditioning of said fluid, such that the expansion fluid that has to expand the preform tube (100) passes through the same and is treated so that it has the necessary properties for the orientation, mainly heating and filtering.

Once the preform tube (100) is fastened and conveniently deformed to achieve a deformed tube in the tempered climatic chamber (2), handling means (4) pass the deformed tube to an area where it is arranged on a base plate (5), with two parallel plates that support a mold (6) split in two symmetrical parts. The handling means (4) position the deformed tube between the two halves of the mold (6) and the base plate (5) actuates the parallel plates so that they advance in the opposite direction until the mold (6) is completely closed, such that the deformed tube is confined inside the mold (6).

Figure 4:
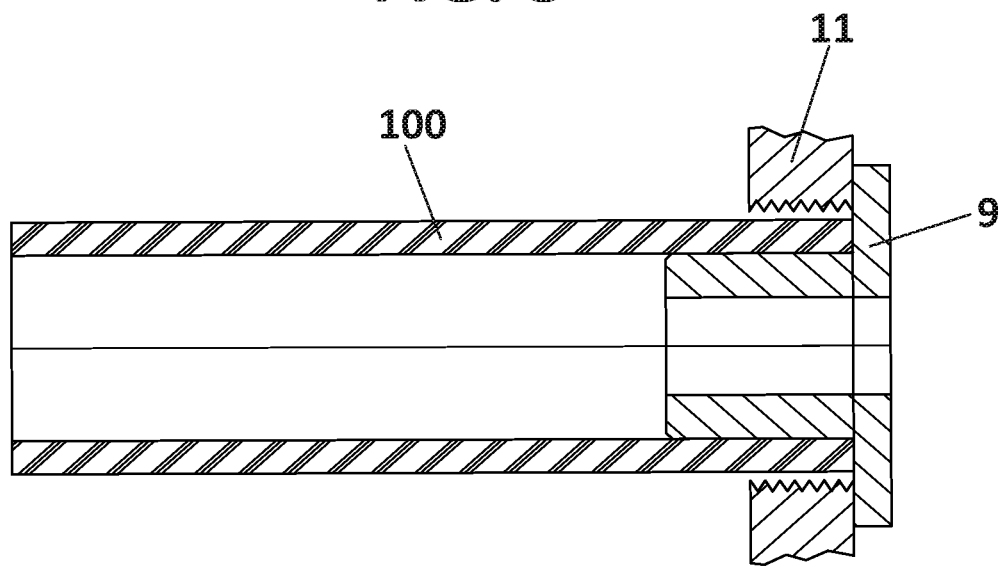
FIG. 4 shows a cross-sectional view of the gripping means, together with a head and a deformed tube.

As the mold (6), is closed, gripping means (11) integrated in the mold (6) simultaneously clamp the deformed tube as shown in FIG. 4, pressing against the gripping head (9), creating a sealed closure.

Subsequently, the expansion fluid is allowed to pass through the hole of one of the gripping heads (9), which in turn comes from the means for the insertion/extraction of a fluid (8), which allows it to have suitable conditions for the molecular orientation, and the same expands the preform against the walls of the mold (6).

Figure 3:
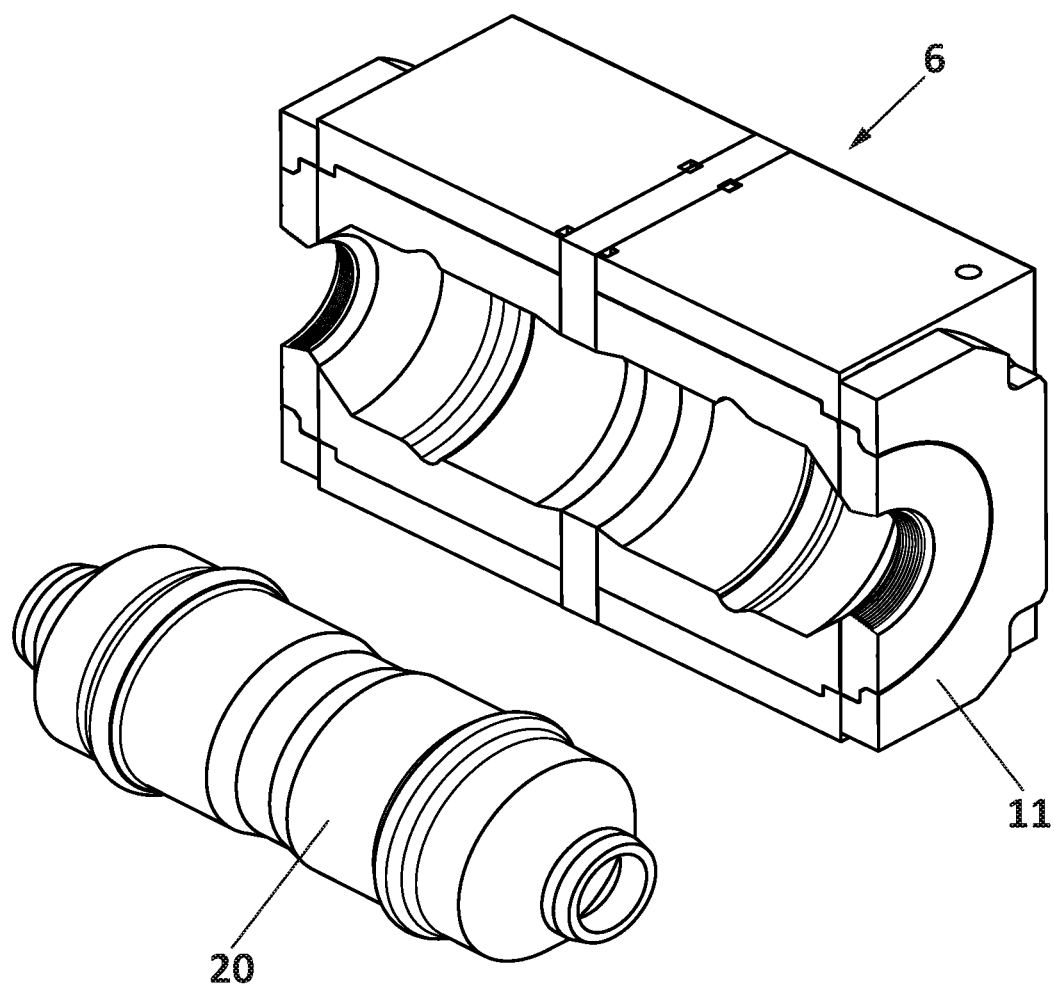
FIG. 3 shows a perspective view of one of the at least two parts of the mold together with the formed fitting or connection.

Once the expansion has taken place, a passage circuit is created, maintaining the pressure, by which the fluid cools the deformed tube on the inside by the passage therethrough, allowing the mold (6) to have a constant temperature. Optionally, the mold could be cooled to help the cooling of the deformed tube. An example of the fitting or connection once it comes out of the mold (6) is shown in FIG. 3.

In a last step, the ends of the fitting or connection (20) are cut by cutting means (7) in order to obtain the final part object of the method of the present invention.

The invention claimed is:

1. A system for manufacturing fittings and connections for biaxially-oriented plastic tubes from a straight preform tube of a non-oriented polymer tube which comprises a first end and a second end, wherein the system comprises:
   a heater configured to control the temperature of the preform tube;
   a first gripping head and a second gripping head, wherein the first gripping head is configured to grip the first end of the preform tube and the second gripping head is configured to grip the second end of the preform tube;
   a handling support configured to support the first gripping head and the second gripping head,
   a base plate that supports two mobile pieces configured to move about;
   a mold that comprises at least two parts, wherein each one of the parts of the mold is arranged on a mobile piece of the base plate, wherein the mold is configured to orient a deformed tube or the preform tube when the at least two parts of the mold are arranged in contact;
   a tempered climatic chamber configured to maintain the temperature of the preform tube at a first predetermined temperature;
   wherein the handling support together with the first and second gripping head are disposed in the tempered climatic chamber and are configured to at least rotate, stretch, contract or deform the preform tube.

2. The system of claim 1, wherein at least the first or the second gripping head comprises an insertion/extraction system for a fluid in the inside of the deformed tube or the preform tube.

3. The system of claim 1, wherein the mold further comprises a clamp arranged at ends of the mold, coinciding with the first end and the second end of the preform tube when the at least two parts of the mold are arranged in contact, wherein the clamp is configured to clamp the deformed tube or the preform tube when the at least two parts of the mold are arranged in contact.

4. The system of claim 1, further comprising a cutter and/or a finishing tool configured to cut the ends of the fitting or connection.

5. The system of claim 1, further comprising a distribution table wherein the preform straight tube of the non-oriented polymer tubing is arranged and is configured to cut the preform tube into pieces of varying lengths.

6. The system of claim 2, wherein the mold further comprises a clamp arranged at ends of the mold, coinciding with the first end and the second end of the preform tube when the at least two parts of the mold are arranged in contact, wherein the clamp is configured to clamp the deformed tube or the preform tube when the at least two parts of the mold are arranged in contact.

7. The system of claim 2, further comprising a cutter and/or a finishing tool configured to cut the ends of the fitting or connection.

8. The system of claim 2, further comprising a distribution table wherein the preform straight tube of the non-oriented polymer tubing is arranged and is configured to cut the preform tube into pieces of varying lengths.

9. The system of claim 3, further comprising a cutter and/or a finishing tool configured to cut the ends of the fitting or connection.

10. The system of claim 3, further comprising a distribution table wherein the preform straight tube of the non-oriented polymer tubing is arranged and is configured to cut the preform tube into pieces of varying lengths.

11. The system of claim 4, further comprising a distribution table wherein the preform straight tube of the non-oriented polymer tubing is arranged and is configured to cut the preform tube into pieces of varying lengths.

12. A method for manufacturing fittings and connections for biaxially-oriented plastic tubes from a straight preform tube of a non-oriented polymer tube which comprises a first end and a second end, wherein the method is carried out with the system of claim 1, and wherein the method comprises:
   a heating stage, wherein a temperature control of the preform tube is carried out;
   a tempering stage, wherein a temperature control of the preform tube is maintained at a first predetermined temperature;
   a gripping stage wherein the gripping of the first end of the preform tube and the second end of the preform tube is carried out,
   a stage of rotation, stretching, contraction and/or deformation of the preform tube after the stage of gripping the first end of the preform tube and of the second end of the preform tube;
   a molding stage having a mold that comprises at least two parts, wherein in the molding stage the orientation of a deformed tube or of the preform tube is carried out when the at least two parts of the mold are arranged in contact.

13. The method of claim 12, further comprising a stage of inserting/extracting a fluid inside the deformed tube or the preform tube.

14. The method of claim 12, further comprising a stage of clamping the deformed tube or the preform tube when the at least two parts of the mold are arranged in contact, followed by a stage of pressurizing a sealed space defined by the mold.

15. The method of claim 12, further comprising a stage of cutting and/or finishing the fittings or connections.

16. The method of claim 12, further comprising a stage of cutting the preform tube in pieces of varying lengths.

17. The method of claim 13, further comprising a stage of clamping the deformed tube or the preform tube when the at least two parts of the mold are arranged in contact, followed by a stage of pressurizing a sealed space defined by the mold.

18. The method of claim 13, further comprising a stage of cutting and/or finishing the fittings or connections.

19. The method of claim 13, further comprising a stage of cutting the preform tube in pieces of varying lengths.

20. The method of claim 14, further comprising a stage of cutting and/or finishing the fittings or connections.

* * * * *